April 1, 1924. 1,489,175
B. A. VANDY
COVER FOR ELECTRICAL OUTLET BOXES
Filed June 14, 1921
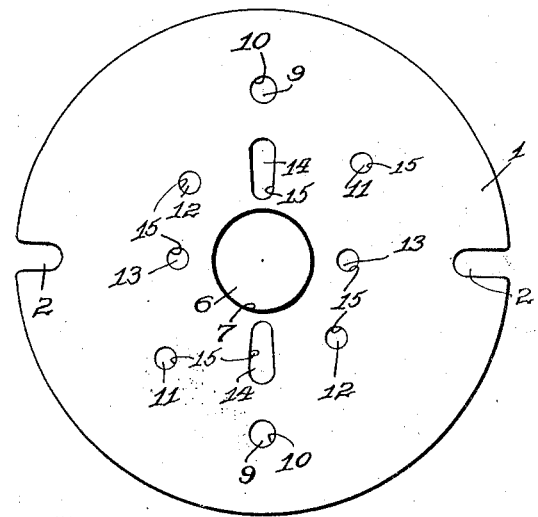
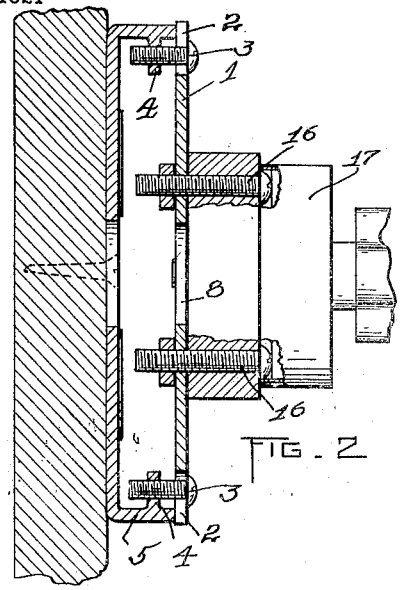
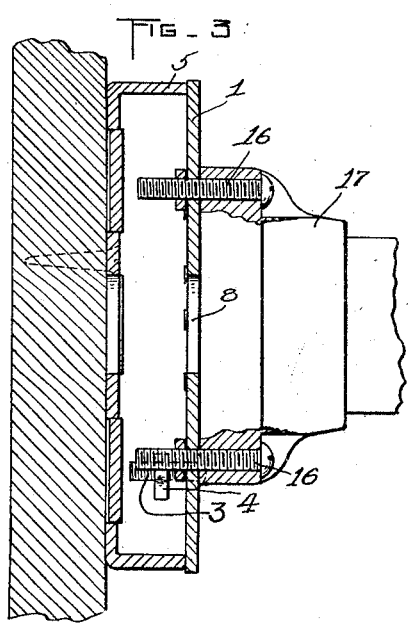
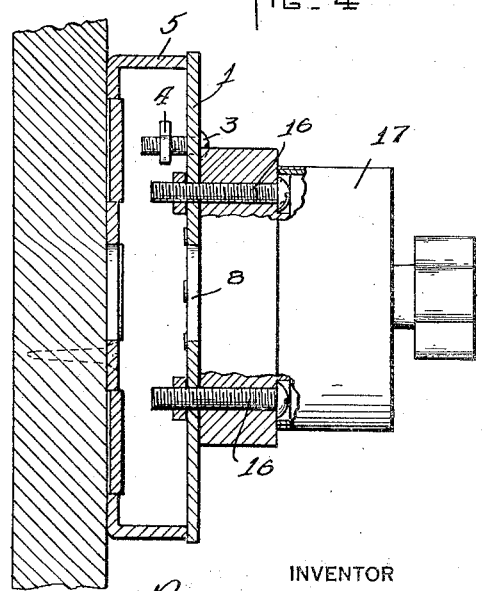
INVENTOR
Burton A. Vandy
BY
Davis & Simms
his ATTORNEYS Patented Apr. 1, 1924.

1,489,175

UNITED STATES PATENT OFFICE.

BURTON A. VANDY, OF ROCHESTER, NEW YORK, ASSIGNOR TO SARAH VANDY, OF ROCHESTER, NEW YORK.

COVER FOR ELECTRICAL OUTLET BOXES.

Application filed June 14, 1921. Serial No. 477,599.

*To all whom it may concern:*

Be it known that I, BURTON A. VANDY, a citizen of the United States, and resident of Rochester, in the county of Monroe and State of New York, have invented certain new and useful Improvements in Covers for Electrical Outlet Boxes, of which the following is a specification.

The present invention relates to covers for electrical outlet boxes and an object thereof is to provide a cover adapted to fit outlet boxes of different diameters and to have attached thereto electrical devices of different diameters, thus making it possible for one cover to be used under a greater number of conditions so that an electrician may reduce the stock required to meet such conditions.

To this and other ends the invention consists of certain parts and combinations of parts, all of which will be hereinafter described, the novel features being pointed out in the appended claims.

In the drawings:

Fig. 1 is a plan view of the cover;

Fig. 2 shows the cover attached to an outlet box with a switch of small diameter fitted thereto;

Fig. 3 shows the cover plate attached to an outlet box with a lamp socket of larger diameter than the switch shown in Fig. 1 secured to the cover plate; and Fig. 4 is a sectional view showing the cover attached to an outlet box and having a switch of a diameter intermediate that of the switch shown in Fig. 1 and the socket shown in Fig. 3.

The cover is in the form of a sheet metal circular disk 1 of a diameter preferably that will fit a four inch box. At diametrically opposite points, this plate is provided with openings or recesses 2 through which the screws 3 may be passed to secure the cover to the internal lugs 4 in the outlet box 5. At its center this disk is provided with a knock out portion 6 held in place by a weakened portion 7 which permits the knock out portion to be readily disconnected from the body of the frame so that an opening 8 may be formed through which the electrical wires may lead or for the reception of a bushing.

To the end of permitting the plate to be secured to a box of smaller diameter, the plate is provided with two knock out portions 9 situated on opposite sides of the central knock out portion 6 and preferably arranged equi-distant from the center of said plate and knock out portion 6. These knock out portions 9 are secured by weakened portions 10 permitting the knock out portions 9 to be displaced readily so that openings will be provided through which the fastening screws 3 may be passed in order to secure the cover to a box 5 of smaller diameter, say three inches.

The cover plate is also provided with a plurality of pairs of knock out portions 11, 12, 13 and 14, each member of each pair being secured by a weakened portion 15. The members of each pair are arranged diametrically opposite each other on opposite sides of the center of the plate. Furthermore, the members of one pair are situated a distance different from each other than the members of the other pairs. This arrangement permits the attaching screws 16 of the different devices 17 to be readily secured to the cover 1. For instance, in Fig. 2 the knock out portions 13 are removed and are utilized for the securing screws 16. In Fig. 3 the knock out portions 11 are utilized for the screws 16. In Fig. 4 the knock out portions 12 are utilized for the screws 16. The knock out portions 14 are elongated and slightly widened from the inner ends thereof. These openings serve for the attachment of any suitable electrical fixture and, when a flat base switch is employed connected through the means of screws pass through the openings provided by the knock out portions 15, the openings 14 may have the wires from the switch lead therethrough.

From the foregoing it will be seen that there has been provided a cover which will serve the purposes of a number of different covers. This cover may be attached to boxes of different diameters and have fixtures of different diameters secured thereto. The openings which are not utilized are closed by the knock out portion.

For reinforced concrete construction work, the cover may be used in connection with any standard box extension. Knock outs are arranged to take a fixture stud. This combination will give an absolutely tight concrete box.

What I claim as my invention and desire to secure by Letters Patent is:

1. A metallic cover for electrical outlet boxes of standard make having a central knock-out portion, openings of smaller diameter than the central knock-out portion for the securing fasteners of one size of standard outlet box, and diametrically arranged knock-out portions smaller than the central knock-out portion and arranged nearer to the central knock-out portion than to the openings to permit the attachment of the cover to a standard box of a smaller size than that to which the cover may be secured through fasteners passed through the openings.

2. A metallic cover for electrical outlet boxes having a central knock out portion, diametrically arranged openings for attachment to a box, and knock out portions smaller than the central knock out portion and arranged in pairs, the members of each pair being diametrically arranged on opposite sides of the central opening, equi-distantly from the center of said opening, the distance between the members of each pair being different from the distance between the members of the other pairs.

BURTON A. VANDY.